US009611579B2

(12) United States Patent
Brasseur et al.

(10) Patent No.: US 9,611,579 B2
(45) Date of Patent: Apr. 4, 2017

(54) HOME APPLIANCE HAVING A CONTROL FIELD AND METHOD FOR SELECTING AND SETTING A PROGRAM AND PROGRAM OPTIONS

(75) Inventors: Jerome Brasseur, Bromma (SE); Davide Bignu', San Vendemiano (IT)

(73) Assignee: Electrolux Home Products Corporation N.V., Brussels (BE)

( * ) Notice: Subject to any disclaimer, the term of this patent is extended or adjusted under 35 U.S.C. 154(b) by 1010 days.

(21) Appl. No.: 13/876,249

(22) PCT Filed: Sep. 28, 2011

(86) PCT No.: PCT/EP2011/066842
§ 371 (c)(1),
(2), (4) Date: Jun. 24, 2013

(87) PCT Pub. No.: WO2012/041895
PCT Pub. Date: Apr. 5, 2012

(65) Prior Publication Data
US 2013/0271259 A1 Oct. 17, 2013

(30) Foreign Application Priority Data

Sep. 30, 2010 (EP) ..................... 10183068

(51) Int. Cl.
*D06F 33/02* (2006.01)
*D06F 39/00* (2006.01)
(Continued)

(52) U.S. Cl.
CPC ............ *D06F 33/02* (2013.01); *D06F 39/005* (2013.01); *D06F 39/12* (2013.01); *G07F 17/34* (2013.01); *H04N 21/4532* (2013.01)

(58) Field of Classification Search
None
See application file for complete search history.

(56) References Cited

U.S. PATENT DOCUMENTS

2002/0043451 A1* 4/2002 Barat ..................... H01H 13/70
200/5 R
2006/0220899 A1* 10/2006 Schult ...................... G09F 9/33
340/815.45
(Continued)

FOREIGN PATENT DOCUMENTS

DE 19834229 A1 2/2000
DE 10144668 A1 3/2003
(Continued)

OTHER PUBLICATIONS

International Search Report mailed Feb. 16, 2012 in corresponding International Application No. PCT/EP2011/066842.
(Continued)

*Primary Examiner* — Mohamed Barakat
(74) *Attorney, Agent, or Firm* — Banner & Witcoff, Ltd.

(57) ABSTRACT

A home appliance has a control field (A) for selecting and setting a program and program option. The control field includes: a plurality of program indicators (2.1-2.5) each having an associated program symbol (2.1a-2.5a), a plurality of program option indicators (4.1-4.5, 6.1-6.4, 8.1-8.4) each having an associated program option symbol (4.1a-4.5a, 6.1a-6.4a, 8.1a-8.4a), a user-operable program selector (2), and a plurality of user-operable program option selectors (4, 6, 8). The program selector (2) and the program option selectors (4, 6, 8) are arranged in an inner region (II) of the control field (A). The program indicators (2.1-2.5) and program option indicators (4.1-4.5, 6.1-6.4, 8.1-8.4) are arranged in a first region (III) at least partially surrounding the inner region (II). The program symbols and the program option symbols are arranged in a second region (IV) at least partially surrounding the first region (III). At least one program symbol (2.1a-2.5a) is assigned to and arranged proximate to each one of the program indicators (2.1-2.5), and at least one program option symbol (4.1a-4.5a, 6.1a-

(Continued)

6.4*a*, 8.1*a*-8.4*a*) is assigned to and arranged proximate to each one of the program option indicators (4.1-4.5, 6.1-6.4, 8.1-8.4).

16 Claims, 3 Drawing Sheets

(51) Int. Cl.
    *D06F 39/12*     (2006.01)
    *H04N 21/45*     (2011.01)
    *G07F 17/34*     (2006.01)

(56) References Cited

U.S. PATENT DOCUMENTS

2007/0159454 A1* 7/2007 Rodriguez .......... A47L 15/4293 345/156
2007/0241938 A1* 10/2007 Ulius-Sabel .......... D06F 39/005 341/22
2008/0312773 A1* 12/2008 Nag .................... A47L 15/4293 700/275
2009/0217712 A1 9/2009 Kim

FOREIGN PATENT DOCUMENTS

| EP | 0396915 A2 | 11/1990 |
| EP | 1806446 A2 | 7/2007 |
| EP | 1847643 A2 | 10/2007 |

OTHER PUBLICATIONS

Extended European Search Report dated Jan. 20, 2011 in corresponding European Application No. 10183068.5.

* cited by examiner

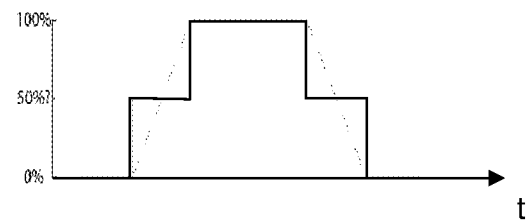
Fig. 4A
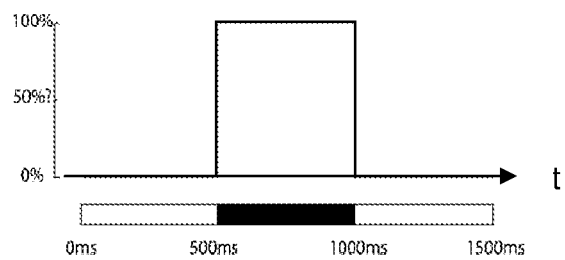
Fig. 4B
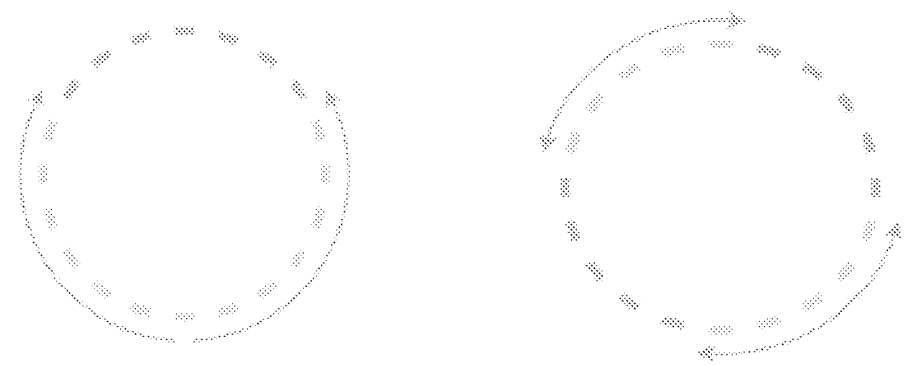
Fig. 5A                                    Fig. 5B

HOME APPLIANCE HAVING A CONTROL FIELD AND METHOD FOR SELECTING AND SETTING A PROGRAM AND PROGRAM OPTIONS

BACKGROUND

The invention relates to a home appliance having a control field for selecting at least one program and at least one program option out of a plurality of program options. The invention also provides a method of operating the control field in response to user selections.

A variety of different control fields for home appliances are known in which the electronic layout and the method of operation for selecting a program and program options out of a plurality of program options is known.

For example EP 0 396 915 B2 proposes a control panel for a washing machine having a rotary switch for selecting a program and as a program option the temperature to be used in the respective program. Using press buttons, additional options for the program can be selected, for example the spin rotation speed, energy saving options or start time delays. The indicators for the selected options, the touch buttons, the rotary switch and the program symbols are non-unitarily distributed over a wide control panel field.

DE 101 44 668 A1 uses a rotary switch for selecting the program and the temperature as a program option. The rotary switch is surrounded by a first circle region of indicators and a second circle region of program and program option symbols. The indicators are used for animation to symbolize the rotation of a laundry drum.

US 2009/0217712 A1 similarly has a rotary switch surrounded by a first circle region of program option symbols and a second circle region of programs formed on a transparent disc. According to the number of program option symbols a number of LEDs is provided, wherein each one of the LEDs is dedicated to one program/program option combination. The indicator of the selected program/program option combination is highlighted to indicate to the user the selected program and program option.

In DE 198 34 229 B4 one rotary switch is used for program selection and several separately arranged program option rotary switches are used to select the respective program options. The selected program and the selected program options are displayed in a separate display fields.

SUMMARY OF SELECTED INVENTIVE ASPECTS

It is an object of the invention to provide a home appliance having a control field and a method for selecting and setting a program and program options, wherein the control field provides a wide program and program option selectability while at the same time the area or space requirement is low.

According to an aspect of the invention home appliance is provided having a control field for selecting and setting a program and program options. Using the control field, one out of a plurality of programs is selected and set, and, if available for the selected program, one out of a plurality of program options is selected. The selected program and the selected program option(s) represent the program and one or more program options which are set for the program to be controlled and executed by a control unit of the home appliance.

One selected program may have only one program option which can be selected or it can have more program options which can be individually selected by the user. For example in case of a washing machine and when selecting the program "colored wash", the washing temperature and the spinning speed can be selected as two representative options for the selected program "colored wash".

For each one of the selectable programs there is a respective program indicator, wherein each program indicator has at least one dedicated (associated) program symbol. There is at least one program option group that has a plurality of program option indicators, wherein each one of the program option indicators has at least one dedicated (associated) program option symbol. This means that there is at least one selectable program that has a program option group in which one among several program options can be selected. In dependency of the selected program all or some of the program options or all or some of the program option groups may be deactivated, i.e. even if there are more program options that may be selectable for other programs, under a currently activated/selected program some or all of the program options or program option groups can not be selected by the user. If for example the home appliance is a washing machine and the program "wool laundry" is selected, the program option group "temperature" may be restricted to a maximum wash temperature of "30°" or "*" (non-heating). Also another program option group may be the "spinning speed" which may be restricted to reduced spinning speeds for the selected program "wool laundry". Another group may be the group of steam treatment as a program option which is deactivated, i.e. can not be selected or activated by the user, if the program is set to "wool laundry".

The control field has a user-operator program selector and a plurality of user-operator program option selectors. As mentioned before, not for all selected programs all of the program option selectors must be activated, but, depending on the program selection, only a subset of program option selectors may be activated. Preferably there is only one (i.e. only a single) program selector.

The selectors, the indicators and the symbols are arranged in a specific relation to each other to achieve space savings for the control field while all, substantially all or nearly all user input selection and selection indication can be made via and in this concentrated and small-area control field. For this purpose the program selector and the program option selectors are arranged in an inner region of the control field while the indicators are arranged in a first region at least partially surrounding the inner region. Further, the program and program option symbols are arranged in a second region at least partially surrounding the first region, wherein at least one program symbol is assigned to and arranged proximate to each one of the program indicators and wherein at least one program option symbol is assigned to and arranged proximate to each one of the program option indicators. Preferably the 'at least partially surrounding' is such that outer periphery of the field which is 'at least partially surrounded' by the outer field is surrounded by a circumferential coverage of at least 60%, more preferably of at least 70% or 80%.

Preferably a symbol is dedicated to only one indicator and conversely, in most cases, the respective indicator is dedicated to the respective symbol. An association between indicator and symbol may be redundant if there is more than one symbol for one indicator. Preferably each program and program option indicator and/or each program and program option symbol is dedicated to only one program and program option selector, respectively.

On the other hand in most cases a program and program option selector is dedicated to a group of program and program option indicators and/or a group of program and program option indicators.

Unlike the prior art rotary switch of a washing machine which is used to select the program and a program option like the temperature with a single switch, according to an aspect of the invention a program selector is used to select the program only and one or preferably more program option selectors are used to set the program options separately. Preferably for each program option group one program option selector is provided. For example in a washing machine a program option group "temperature" selector and a program option "spinning speed" selector or a program option group "energy setting" selector are provided.

With this arrangement the electronically active area of the control field, where the program and program option selectors and the program and program option indicators are provided, is concentrated on a small area. Thus the front panel space requirement and the requirement for user interface electronics is reduced. The interface electronics like the selectors and indicators have to withstand the ambient influences like hits against the outer body of the home appliance, high humidity or spilled water, which can be more simply and cost effectively provided on small active areas. Preferably all user interface elements (all indicators, all symbols and all selectors) of the home appliance are arranged within the control field.

Preferably the program and program option symbols are printed, etched or otherwise marked on a front panel of the home appliance, which does not need to fulfill the delicate electronics/environment interface requirement. Preferably the program and program option symbols are placed close to the program and program option indicators to simplify the user association between program and program option indicator and the selected program and selected program option, respectively. In an embodiment the program and program option symbols or at least a portion thereof may be highlighted or back-lighted by one or more of the indicators. For example the program and program option indicators may be lamps or LEDs that direct the light at least partially radially outward to backlight or highlight the symbol arranged in a radial direction from the respective indicator (radially when seen or approximately seen from the center of the control field). As mentioned above, in both embodiments the area of the involved electronics is restricted to the inner and first surrounding region.

According to a preferred embodiment the program indicators are arranged proximate to the program selector and the program option indicators are arranged in groups of option indicators, each group being arranged proximate to the dedicated one of the program option selectors. As mentioned above, a 'group' of option indicators can consist of only one indicator, if the respective group provides only one option which is activated or deactivated by the user (if compatible with the selected program). If for example the home appliance is a dryer and for the selected programs an "anti-crease treatment" is available, it may be activated or deactivated by a program option "anti-crease" selector which then has only one indicator indicating whether it is activated (indicator on) or deactivated (indicator off).

By arranging the program indicators close to the dedicated (i.e. assigned) program selector and the program option indicators close to the dedicated (i.e. assigned) program option selector, the user overview and thus the user comfort is increased as (s)he easily can track the program and program options selection by the respectively activated indicator which is the current setting.

Preferably there is at least one group of program options to which at least two, three, four or more program option indicators are assigned to. Each program option indicator corresponds to one selectable program option. In an embodiment two or more program option symbols are assigned to at least one of the program option indicators. In such a cast the respective program option indicator is redundantly assigned and the actual program option setting depends for example on the currently selected program.

Minimizing the space requirement while providing full overview for the user is further improved when the program indicators and the program option indicators are arranged on a circle, partial circle, ellipse or partial ellipse around the inner region. This correspondingly applies when the program symbols and the program option symbols are arranged in a circle, partial circle, ellipse or partial ellipse around or at least partially around the first region.

In a further embodiment the program and at least a portion of the program option selectors are arranged on a circle, partial circle, ellipse or partial ellipse for example surrounding a center region and/or the program option selectors have the form of a portion of a circle (including ring segment form and pie slice form).

Preferably all or at least a portion of the program and the program option selectors are touch-sensitive or soft-touch selectors. Preferably the program and program option selectors are no change-over or rotary switches. For example in the high humidity surroundings of a washing machine the touch-sensitive or soft-touch selectors are more reliable than change-over or rotary switches.

In particular when the program and program option selectors do not occupy the full center region of the inner region, then the center region can be provided with further selectors and indicators. For example additional auxiliary program option indicators and selectors can be provided; such as a start delay selector and/or indicator, a power on/off switch, a door open selector and/or a door open indicator.

Preferably the indicators are optical indicators, in particular lamps or LEDs. In an embodiment one or more of the program and program option indicators are multi-color indicators which are adapted to indicate at least two different states with two different colors. For example a home appliance on/off indicator may indicate the off state in red color and the on state in green color. Or the door open state indicator may indicate the open state of the door in red and the closed state of the door in green.

In an alternative or additional embodiment the program and program option indicators may be multi-brightness level indicators which are adapted to indicate a state with at least three different brightness levels. For example if a program option is not selected, the dedicated program option indicator is off. If in a group of program options one program option may be selected, the dedicated program option indicator may indicate the possibility to be selected with a dimmed state, i.e. with a reduced brightness or intensity. On the other hand if the program option has been selected, a full indicator state, i.e. a full brightness level state indicates that this option has been selected. The multi-brightness indication can also mean that the brightness state is changed over time to indicate to the user that action is required. For example a door open indicator may vary its intensity from zero intensity to half intensity to full intensity to half intensity to zero intensity and again repeating this sequence to indicate that a door of the appliance, for example of a washing machine, is open and needs to be closed. Similarly by varying the brightness it can be indicated to the user that the start selector has to be pressed to start operation of the appliance with the respectively selected program and its options.

Preferably the program selector, all program option selectors and all program and program option indicators are arranged on one single PCB or electronic board. The size of the PCB or board may be smaller than or equal to 25 cm², 30 cm², 35 cm², 40 cm², 50 cm² or 60 cm².

According to a method of the invention, the control field of the appliance as described above is operated in the following manner.

In one embodiment, if one of the programs is selected by the user operating the program selector, the user can only select those program options by touching the program option selector which is compatible with the selected program. If for example the program "wool wash" is activated in a washing machine, then the group "temperature" of the program options is restricted to "*" (no heating) or to a washing temperature of "30° C." only, while the other temperatures in the group "temperature" are disabled, for example the wash temperatures 40° C., 60° C. and 90° C. If in an embodiment the selected program is excluding top speed in the group "spinning speed", then only the reduced spinning speeds are available for selection by the user using the program option selector "spinning speed".

In an alternative or additional embodiment, if after selecting one of the programs, the respective group of program options allows selection of more than one program options (for example temperature 30°, 40°, 60° and 90°), then by touching the respective program option selector the program option indicators are activated (switched on) in a clockwise direction or counter clockwise direction with each touch of the program option selector. More preferably for the clockwise or counter-clockwise activation of the indicators is applied to all stepwise selections by the program and program option selectors. Preferably in this case the respective program option group provides selection/setting of the respective program option (parameter) with ascending or descending values in clockwise or counter clockwise direction (e.g. 30°-40°-60°-90° or the other way with each touch). When in this embodiment in particular the end of the row of program options in a group is reached, touching the program option selector of this group again results in jumping of the setting and highlighting the indicator at the opposite end of the available program options in this group. If for example in a washing machine the group "temperature" provides 30°, 40°, 60° or 90°, the sequence of selection in clockwise or counter clockwise direction by pushing the program option selector is 30-40-60-90-30- and so on.

According to a preferred embodiment, by the selection of one of the plurality of programs, in particular when the user presses the program selector, the last setting for the presently selected/activated program is indicated and activated as the default setting. As an example for washing machine, if the starting condition is "wool-wash" program and the user switches to "color-wash" program, then the settings of the last "color-wash" that was used by the user (or in a virgin state which was set as a default setting by the manufacturer) is retrieved by a control unit of the home appliance and indicated. As an example, if the "cotton-wash" was made at 60° and the user selects the color-wash, then the program option "temperature" jumps from 30° to 60° which was the setting for the last color-wash the user used the last time when running the program color-wash.

Preferably when the home appliance is energized (switched on) or when a program/option selector is touched by the user, the last setting performed by the user (i.e. the options selected by the user in the previous washing/drying cycle, for example) are retrieved and shown via the indicators on the control field.

In an embodiment the indicators of the control field are used to indicate a state of a running program or of a program sub-routine for at least a portion of the running program or sub-routine. If for example in a washing machine the program is started, the indicators can be used to indicate the filling of the tub with water by activating the indicators from a lower level to a higher level on the control field area to symbolize the rising water level. And/or the rotation of the drum during tumbling mode can be indicated by highlighting some of the indicators giving an impression of a rotation or a fast rotating speed of the indicators to indicate the spinning of the drum.

BRIEF DESCRIPTION OF THE DRAWINGS

References are made in detail to preferred embodiments of the invention, examples of which are illustrated in the accompanying figures, which show.

DETAILED DESCRIPTION OF EXAMPLE EMBODIMENTS

Figure 1:
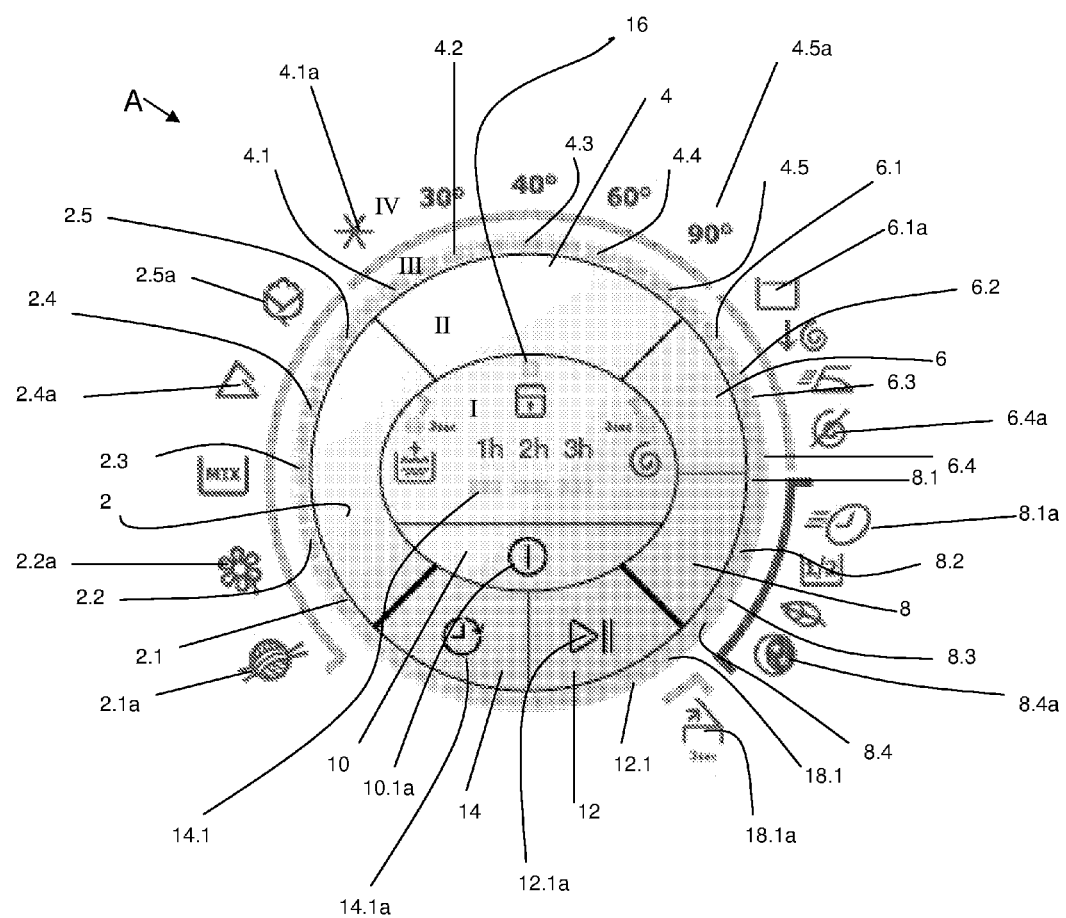
FIG. 1 a first embodiment of a control field for a washing machine.

FIG. 1 shows a first embodiment of a control field A of a washing machine, the control field being basically composed of four regions which are from center to outside: the center region I, the inner region II, the first ring region III and second ring region IV. The center region I comprises in this example the on/off or power button 10 as explained below. The inner region II comprises a program button 2, a temperature button 4, a spin button 6, an energy option button 8, a start/pause button 12 and a delay button 14. In this example the inner region II is completely surrounding the center region I, however in other embodiments the center region I may be surrounded by the inner region II only partially.

The first ring region III is surrounding the inner region II as a closed circle of LEDs which are arranged one by the other in an equidistant manner. In this embodiment the first ring region III is forming a complete circle, however it may also surround the inner region II only partially. Also the indicators (LEDs) may not be evenly distributed in the first ring region III and some positions may be left without an indicator or the spacing between the indicators may be different. The second ring region IV partially surrounds the first ring region III and is formed of program and program option symbols.

The second ring region IV here only partially surrounds the first ring region III, however it also may completely surround the first ring region III. For example when the delay symbol 14.1a is not formed on the delay button 14 but in the area of the second ring region IV and also the start/pause symbol 12.1a is not arranged on the start/pause button 12, but in the second ring region IV.

Preferably the program symbols and program option symbols arranged in the second ring region IV are formed on a front or top panel of the home appliance and no electronic elements like indicators or buttons are required in this region IV. Electronic components like touch-sensitive buttons and indicators like lamps or LEDs are only required in the center region I, the inner region II and the first ring region III. Thus, while the outer dimensions of the control field A (and respectively the control field B of FIG. 2) is essentially bigger than the outer dimensions of the first ring region III due to the outer dimensions of the second ring region IV, the space requirements of the electronic components is restricted to the outer dimensions of the first ring region III. Thus a circuit board for supporting the electronic components may be restricted to the outer dimensions of the first ring region III or only some millimeters beyond the outer dimensions of the first ring region III. Preferably if all user interface elements of the home appliance are placed within the control field A, B the space requirement for the circuit board and the spatial distribution of all user interface electronic components is minimal.

Referring to the detailed layout of the control field A shown in FIG. 1, a group of program indicators 2.1-2.5 is dedicated to the program button 2. The program indicators 2.1-2.5 are arranged beyond the outer circumference of the program button 2 in an angular section of the control field A corresponding to the angular section of the program button's circumferential extension. Then in the corresponding angular section of program button 2 and of the program indicators 2.1-2.5, program symbols 2.1a-2.5a are arranged. In this example one dedicated symbol is assigned to each one of the program indicators. Indicator 2.1 and symbol 2.1a indicate the selection of the program "wool wash", if indicator 2.1 is activated. Correspondingly indicator 2.2 and symbol 2.2a are for "delicate wash"; indicator 2.3 and symbol 2.3a are for "mixed laundry wash"; indicator 2.4 and symbol 2.4a are for "synthetic wash"; and indicator 2.5 and symbol 2.5a are for "cotton wash".

In practice, preferably, the program button 2 is a textile/laundry type selection button wherein each of the program indicators 2.1-2.5 corresponds to a specific textile or type of laundry to be selected by the user according to his/her needs.

The angular sector of the control field corresponding to the temperature button has in the first ring region III the temperature indicators 4.1-4.5 and in the second ring region IV the temperature symbols 4.1a to 4.5a. When upon user selection temperature indicator 4.1 is illuminated it is indicated via symbol 4.1a that the washing water is not heated. When the respective indicator is illuminated, indicators 4.2 to 4.5 and temperature symbols 4.2a to 4.5a represent in this order selection of the wash temperature to be heated to 30°, 40°, 60° and 90°, respectively.

In the angular section of the spin button 6 in the first ring region III the dedicated indicators are 6.1 rinse and hold indicator and spin speed indicators 6.2 to 6.4. In the second ring region IV of the angular section assigned to the spin button 6 the rinse and hold symbol 6.1a and the spin speed symbols 6.2a to 6.4a are arranged in spatial relation to the respectively dedicated indicators 6.2 to 6.4. These indicators are in turn arranged in close spatial relation to the spin button 6. Activation of the rinse and hold indicator 6.1 by user selection means that after the washing sequence the rinsing steps are performed and after the last rinsing step the rinsing water is not drained but hold within the tub. When the other program options are selected by the spin button and one of the spin speed indicators 6.2 to 6.4 is illuminated, the user has selected and is confirmed thereby of one of the spinning speeds which are: reduced top spinning speed, medium spinning speed and no spinning as indicated by indicators 6.2 to 6.4, respectively. In an alternative embodiment an additional indicator can be provided that indicates that the user has selected the top spinning speed of the washing machine.

By the user pressing the energy option button 8 the user can select and set for the program a respective energy or another option of the program as shown by the energy option or other option symbols 8.1a to 8.4a which are dedicated to the respective energy option and other option indicators 8.1 to 8.4.

As shown, some symbols are placed in a non-button (or button-free) area of the center region I. For example the extra rinse indicator 21.1, the time delay symbols (1h, 2h, 3h), and the lock symbol dedicated to the program run indicator 16. Further, as shown, some of the symbols are placed directly on the respective button like the power symbol 10.1a on the power button 10, the delay symbol 14.1a on the delay button 14, and the start/pause symbol 12.1a on the start/pause button 12. Further, the non-button area in the center region I has additional indicators like the delay time indicators 14.1 to 14.3. The door lock indicator 18.1 is arranged close to the start/pause button 12 in the first ring region III and close to the door lock symbol 18.1a arranged in the second ring region IV.

Figure 2:
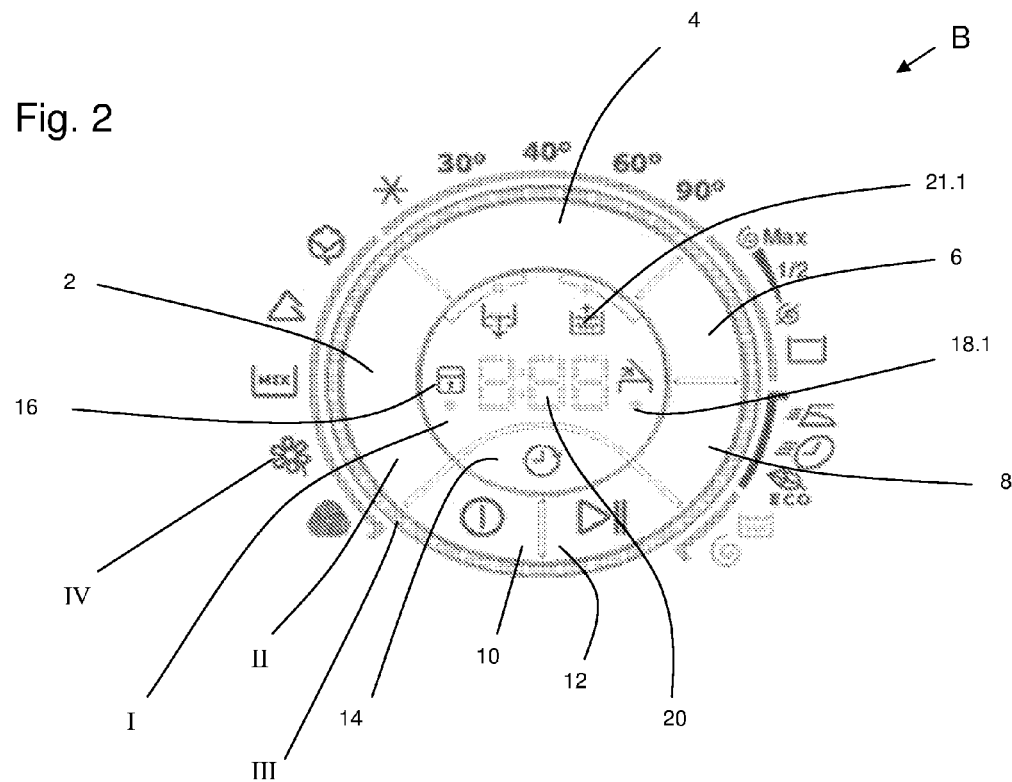
FIG. 2 a second embodiment of a control field for a washing machine.

In the embodiment shown in FIG. 2 the control field B is basically similar to the control field A shown in FIG. 1. Using identical reference numerals indicates that the same buttons are provided with the same function. Reference numerals for the symbols and indicators are widely omitted as the reader can easily assign the respective symbol and the indicators arranged close to the symbol from the respective symbols/indicators used in the control field A of FIG. 1. The difference between control fields A and B is that the design of the buttons is slightly changed and the locations of the power button 10 and the delay button 14a are exchanged with each other. Further, instead of providing the time delay symbols 1h, 2h, 3h and respective indicators 14.1 in the center region I of the embodiment shown in FIG. 2, a digital time display 20 is arranged in the center region I. Depending on currently activated or changed program and program options setting by the user, the digital time display 20 indicates for the currently running washing program e.g. the delay times or the residual time until program end.

Figure 3:
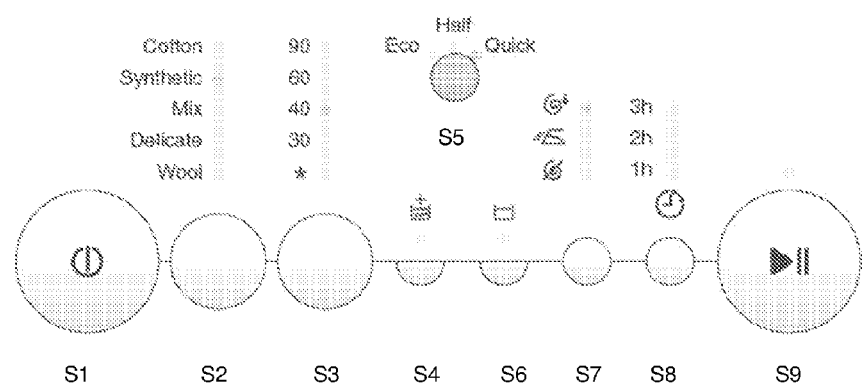
FIG. 3 a simplified flow diagram for illustrating the setting of a program and of program options, FIGS. 4A and 4B intensity/time diagrams exemplifying the intensity modulation of indicators, and FIGS. 5A and 5B two examples for indicating program sequences of a running program using the indicators.

FIG. 3 shows a sequence of steps S1 to S9 as an exemplary embodiment how a user can press the buttons to select a program and its options. In step S1 the user powers on the washing machine by pressing power button 10. In step S2 the user selects the (main) program by pressing program button 2. The indicator "synthetic" is highlighted and thus selected by the user which corresponds to indicator 2.4 and symbol 2.4a in FIG. 1. In step S3 the user selects the temperature by pressing temperature button 4 as many times as required to come to the selection "40°" which corresponds to indicator 4.3 and to the "40°" symbol 4.3a. In step S4 the user presses and holds the spin button 6 for three seconds, whereby the program option "extra rinse" is selected which is indicated by activating the indicator at the extra rinse indicator 21.1. In step S5 the user repeatedly presses (if necessary) energy option button 8 until the program option "quick" is activated which corresponds to energy option indicator 8.1 and symbol 8.1a in FIG. 1. In step S6 the user selects the program option "rinse and hold" by pressing spin button 6 for three seconds permanently such that the rinse and hold indicator 6.1 at the rinse and hold symbol 6.1a in FIG. 1 is activated. Thereafter the user shortly presses spin button 6 such that the reduced spinning speed is selected corresponding to indicator 6.2 and symbol 6.2a in FIG. 1. In step S8 the user presses the delay button 14 as many times as necessary to deactivate the time delay, which means that none of the time delay indicators 4.1 to 4.3 is activated and the program starts immediately after pressing the start/pause button in step S9.

FIG. 4A and 4B indicate different time behaviors of the indicators to indicate to the user different options or states. In FIG. 4A the intensity is temporally varied from 0% to 50% to 100% to 50% to 0% which can be denoted as "soft" blinking. This can for example be used to indicate to the user all of the optional program option settings which are available after the corresponding program has been selected using program button 2. For example when the program "wool wash" has been selected as indicated by indicator 2.1, then only the temperatures "*" (no heating) and 30° can be selected which is indicated by soft blinking of indicators 4.1 and 4.2. If in a previous program run "wool wash" already one of the temperatures has been selected or if there is a factory pre-setting, one of the two indicators 4.1 or 4.2 is activated showing that this option has been selected and the other indicator 4.2 or 4.1 is soft blinking to indicate that the user has a selection between these two options. This soft blinking is exemplary for all other of the other options that can be selected and gives a quick overview for the user which option groups will be available for the currently selected program.

FIG. 4B shows just an on/off blinking which is repeated with identical on/off periods. This "hard" blinking is used to indicate to the user specific states of the washing machine. For example when the door is open which is indicated at indicator 18.1 or when the washing machine can be started or is in a pause-state as indicated by blinking the start/pause indicator 12.1. Instead of a soft blinking, an option that may be selected by a user can also be indicated by activating the respective indicators only with reduced intensity, for example with 50% intensity.

FIG. 5A exemplifies an animation mode of the indicators arranged in the first ring region III. In the depicted mode the indicators are illuminated from below running clockwise and counter clockwise from below upwards to the top and are switched on at both sides of the control field step by step with hard intensity to indicate during the running washing program that the drum is filled with fresh water. Water filling can be indicated for example at the start of the wash program or when starting the filling during the rinse step. In this mode all indicators can first be cancelled and then the indicators from below to top be set to 100% intensity. Or for user convenience the selected program and program option indicators of the running program may keep their 100% intensity while the other indicators in the first ring region III participate in the animation mode by switching between 0% and 50% intensity only.

In FIG. 5B three neighboring indicators at the top and the bottom of the indicators in the first ring region III are set to 50% intensity. The three active indicators are moving clockwise and counterclockwise back and forth as indicated by the arrow such that it is symbolized that the drum is rotated in a tumbling mode forward and backward according to the clockwise and counter clockwise moving of the three activated indicators. As before in FIG. 5A, all other indicators in the first ring region III may be switched off or the indicators indicating the selected program and the selected program options for the running program are kept switched on at 100% intensity.

REFERENCE NUMERAL LIST

A control field
B control field
2 program button
2.1-2.5 program indicator
2.1a-2.5a program symbol
4 temperature button
4.1-4.5 temperature indicator
4.1a-4.5a temperature symbol
6 spin button
6.1 rinse and hold indicator
6.1a rinse and hold symbol
6.2-6.4 spin speed indicator
6.2a-6.4a spin speed symbol
8 energy option button
8.1 - 8.4 energy option indicator
8.1a - 8.4a energy option symbol
10 power button
10.1a power symbol
12 start/pause button
12.1 start/pause indicator
12.1a start/pause symbol
14 delay button
14.1-14.3 delay indicators
14.1a delay symbol
16 program run indicator
18.1 door lock indicator
18.1a door lock symbol
20 time display
21.1 extra rinse indicator
I center region
II inner region
III first ring region
IV second ring region

The invention claimed is:

1. A home appliance having a displayed control field for selecting and setting a program by a user, the displayed control field comprising:
   a plurality of program indicators each having at least one dedicated program symbol,
   a plurality of program option indicators each having at least one dedicated program option symbol,
   a user-operable program selector, and
   a plurality of user-operable program option selectors for selecting one of the plurality of options,
   wherein the program selector and the program option selectors are arranged in an inner region of the control field,
   wherein the program indicators and program option indicators are arranged in a first region at least partially surrounding the inner region,
   wherein the program symbols and the program option symbols are arranged in a second region at least partially surrounding the first region,
   wherein each one of the program symbols is arranged proximate to and radially aligned with the respective one of the program indicators it is dedicated to, and
   wherein each one of the program option symbols is arranged proximate to the respective one of the program option indicators it is dedicated to;
   wherein only those program options for selection by touching the program option selector which are compatible with the selected program are enabled, and/or if in a group of program options dedicated to a specific one of the program option selectors more than one program option is selectable for the selected program, one of the program option indicators of selectable program options is stepwise activated in clockwise or counter-clockwise direction.

2. The home appliance according to claim 1,
wherein the program indicators are arranged proximate to the program selector , and/or
wherein the program option indicators are arranged in groups of option indicators, each group being arranged proximate to the dedicated one of the program option selectors.

3. The home appliance according to claim 1, wherein the program indicators and/or the program option indicators are arranged on a circle, partial circle, ellipse or partial ellipse around the inner region.

4. The home appliance according to claim 1, wherein all or at least a portion of the program and the program option selectors are touch-sensitive selectors.

5. The home appliance according to claim 1, wherein all or at least a portion of the program and the program option selectors are arranged on a circle, partial circle, ellipse or partial ellipse, surrounding a center region.

6. The home appliance according to claim 1, wherein a center region arranged in the inner region comprises one or more of the following:
   one or more auxiliary program option selectors,
   one or more auxiliary program option indicators,
   one or more auxiliary program option symbols,
   one or more appliance state selectors,
   one or more appliance state indicators, and
   one or more appliance state symbols.

7. The home appliance according to claim 1, wherein the home appliance is a washing machine or a dryer and the program option selectors include one or more of the following selectors:
   a temperature selector,
   a rotation speed selector,
   a weight selector,
   a final state selector,
   a start delay selector, and
   a consumption degree selector.

8. The home appliance according to claim 1, wherein the inner region further includes one or more of the following selectors:
   a start/pause selector,
   a start delay selector,
   a door unlock selector.

9. A method of selecting and setting a program and program options of a home appliance having a control field according to claim 1, wherein after the method comprises:

selecting one of the plurality of programs, and
enabling only those program options for selection by touching the program option selector which are compatible with the selected program, and/or
if in a group of program options dedicated to a specific one of the program option selectors more than one program option is selectable for the selected program, stepwise activating one of the program option indicators of selectable program options in clockwise or counter-clockwise direction,
wherein when the end of a row in a group of indicators of selectable program options is reached in this stepwise activating sequence, starting the program option indication/selection at the beginning of the row in a group of indicators of selectable program options with the next touch of the selector.

10. The method according to claim 9, wherein after selecting one of the plurality of programs, all or at least a portion of the program options that have been selected in the last setting of the respective program are activated as a default setting.

11. The method according to claim 9, wherein after selecting one of the plurality of programs,
if only one out of a group of program options is available, making this only program option out of the group of program options the default setting and/or
inactivating the inputs the program option selector dedicated to this group of program options, wherein the default setting is indicated by the dedicated program option indicator, and/or
if none out of a group of program options is available, deactivating the respective program option selector, wherein the inactivation of the program option selector is indicated by an inactive signal by one or more of the program option indicators dedicated to this program option selector.

12. The method according to claim 9, wherein after power-on of the home appliance the last selected program and the last selected program options are default settings.

13. The method according to claim 9, wherein during a running program and at least temporally all or a portion of the indicators are used for animation.

14. The method according to claim 9, wherein the control field (A, B) comprises a start/pause selector and a dedicated start/stop indicator.

15. The method according to claim 9, wherein the control field comprises a door state indicator indicating the open state and the closed state of a door of the home appliance.

16. The home appliance according to claim 5, wherein the selectors form angular segments of a circle or ellipse.

* * * * *